V. BEAUREGARD.

BOOT OR SHOE SOLE EDGE TRIMMING MACHINE.

No. 10,960. Reissued Oct. 2, 1888.

WITNESSES.

Robert Wallace,

Matthew Clark.

INVENTOR.

Victor Beauregard by Wm. Dillaclood his atty

N. PETERS, Photo-Lithographer, Washington, D. C.

UNITED STATES PATENT OFFICE.

VICTOR BEAUREGARD, OF ST. HYACINTHE, QUEBEC, CANADA.

BOOT OR SHOE SOLE EDGE TRIMMING MACHINE.

SPECIFICATION forming part of Reissued Letters Patent No. 10,960, dated October 2, 1888.

Original No. 367,264, dated July 26, 1887. Application for reissue filed April 18, 1888. Serial No. 271,113.

*To all whom it may concern:*

Be it known that I, VICTOR BEAUREGARD, of St. Hyacinthe, in the county of St. Hyacinthe and Province of Quebec, Canada, have invented certain new and useful Improvements in Edge-Trimming Machines for Boots and Shoes; and I do hereby declare that the following is a full, clear, and exact description of the same.

My invention has for its object to provide an apparatus for trimming the edges of soles, shanks, and heels of boots and shoes which shall be simple in construction and effective and cleanly in operation, the waste material being removed from the cutter and discharged at a distance. It may be described as consisting, broadly, in making the shaft on which the cutting-knife proper is set hollow, so that the portions shaved off from the heel, sole, or shank will fall into the shaft and be delivered at any point desired.

For full comprehension of the invention reference must be had to the annexed drawings, in which—

Figure 1:
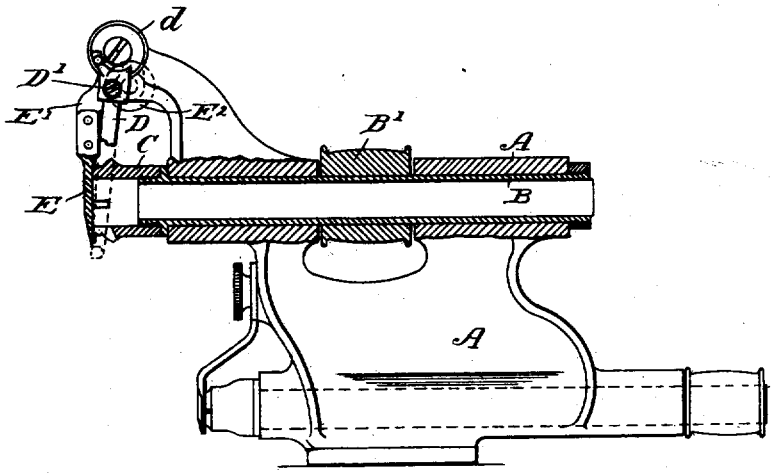
Figure 2:
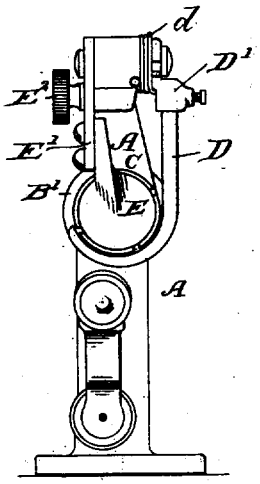
Figure 3:
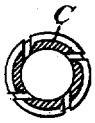

Figure 1 is a longitudinal sectional elevation taken through center of shaft; Fig. 2, an end view of machine; Fig. 3, a transverse section on line *x x*, Fig. 4, of knife; and Fig. 4, a modification of the construction.

Similar letters of reference indicate like parts.

A is the frame of the machine, preferably of some such form as that shown, in which are formed bearings for the shaft B, having mounted on it pulley B′, rotated by any suitable power.

C is the knife proper, made, as shown, in the shape of a tube, with cutting-edges formed tangentially in the periphery, the section of the knife being varied to suit a bevel or a straight cut and properly shaped for a sole, shank, or heel.

D is the sole-guard, secured in a socket, D′, pivoted to the frame, and provided with a spring, *d*.

E is the welt-guard, formed of a recessed plate, into which the knife enters slightly, secured to an arm, E′, pivoted to the frame, and fastened by a set-screw, $E^2$.

Any number of cutting-edges or slots may be used, from one upward, and it will be seen that the action of the knife resembles closely that of a planer.

Figure 4:
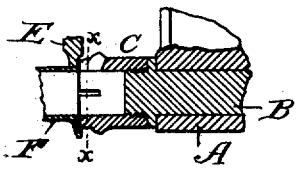

In some cases the shaft B may be made solid and the knife C secured to the end of it and a tube, F, provided, supported by the welt-guard E, and lying close to the front end of the knife, said tube F projecting, as shown in Fig. 4, toward the front, into which the chips will fall and at the end of which they will be delivered.

Suitable means will be provided by which the chips can be taken from the end of the shaft B or tube F into proper receptacles.

Having thus described my invention, I beg to state that what I claim is as follows:

1. In an edge-trimming machine, the herein-described combination, with a tubular knife, of a hollow shaft on which it is mounted, all substantially as described.

2. The combination, in an edge-trimmer, of a tubular knife with open cutting-edges and a hollow shaft on which it is mounted, all substantially as described.

3. The combination, with the shaft B, carried in the frame and suitably rotated, of knife C, sole-guard D, and welt-guard E, both secured to the frame, all as and for the purposes set forth.

4. In a boot and shoe edge trimming machine, the combination, with a rotary shaft, of a tubular knife carried by the said shaft and having one or more tangential cutting-slots which are open to the end of the knife, and which thus form open cutting-edges, substantially as set forth.

VICTOR BEAUREGARD.

Witnesses:

WM. A. MACLEOD,

ROBERT WALLACE.